United States Patent [19]

Rollmann et al.

[11] 4,205,052

[45] May 27, 1980

[54] MANUFACTURE OF SYNTHETIC MORDENITE

[75] Inventors: Louis D. Rollmann, Princeton, N.J.; Ernest W. Valyocsik, Yardley, Pa.

[73] Assignee: Mobil Oil Corporation, New York, N.Y.

[21] Appl. No.: 8,368

[22] Filed: Feb. 1, 1979

[51] Int. Cl.² .............................................. C01B 33/28
[52] U.S. Cl. ..................................... 423/329; 423/328
[58] Field of Search ............................... 423/328–330; 260/448 C; 252/431 N, 455 Z

[56] References Cited

U.S. PATENT DOCUMENTS

| | | | |
|---|---|---|---|
| 3,306,922 | 2/1967 | Barrer et al. ...................... 260/448 C |
| 3,436,174 | 4/1969 | Sand ...................................... 423/328 |
| 3,947,482 | 3/1976 | Albers et al. ......................... 423/328 |
| 4,018,870 | 4/1977 | Whittam ........................... 423/328 X |
| 4,107,195 | 8/1978 | Rollmann ............................. 423/329 |

OTHER PUBLICATIONS

Aiello et al., "J. Chem. Soc. (A)," 1970, pp. 1470–1475.

*Primary Examiner*—Edward J. Meros
*Attorney, Agent, or Firm*—Charles A. Huggett; Vincent J. Frilette

[57] ABSTRACT

A process for manufacturing synthetic mordenite in which the shape or other feature of the microscopic mordenite crystals is controlled by including an organic basic nitrogen compound in the forming solution.

6 Claims, 3 Drawing Figures

Tributyl amine 1.5µ

No Modifier

1μ

Ethyl Pyridinium Bromide 1.5μ

Tributyl amine 1.5μ

MANUFACTURE OF SYNTHETIC MORDENITE

BACKGROUND OF THE INVENTION

1. Field of the Invention

This invention is concerned with a process for manufacturing a synthetic zeolite. In particular, it is concerned with a method for the synthesis of mordenite with control of the shape or other characteristics such as size and discreteness of the synthetic microscopic crystals or aggregates thereof formed during crystallization.

2. Prior Art

The commercial synthesis of zeolite minerals for use as catalysts and as sorbents has become of substantial importance in the last two decades. The zeolite minerals, as that term is herein used, refers to those crystalline inorganic structures formed of three-dimensional arrays of silicon and aluminum tetradhedrally coordinated with oxygen in such a manner as to form a network of well defined pores and channels of near-molecular dimensions. The channels usually are filled with water when the zeolite is crystallized, but after dehydration the pore space thus formed is receptive to a variety of organic guest molecules provided these are not too bulky. Because of the regularity of the crystal structure, dehydrated zeolite crystals exhibit a characteristic sorption behavior sometimes referred to as zeolitic sorption. For further background, the reader is referred to "Zeolite Molecular Sieves" by Donald W. Breck, published by John Wiley & Sons, New York, N.Y. (1974), the entire contents of which are herein incorporated by reference.

With certain zeolites, and under appropriate conditions, catalytic transformation of organic molecules occurs when these are brought into contact with the mineral. These reactions generally are believed to occur within the pores of the crystals. Undoubtedly, the most important catalytic application for zeolites is the catalytic cracking of heavy petroleum oils to gasoline and fuel oil, widely practiced in petroleum refineries, but a number of other reactions, too, have been reported. By way of general background, the reader is referred to "Zeolite Chemistry and Catalysis" by Jules A. Rabo, A.C.S. Monograph 171, American Chemical Society, Washington, D.C. (1976), the pertinent portions thereof which refer to catalysis and sorption by mordenite being herein incorporated by reference.

Because the sorption or catalytic transformation of substances by zeolite minerals is effected within the channels of the crystals, the orientation of the channel direction with respect to crystal dimensions, the length of the channel, and most probably even the imperfections in the crystal can favorably or unfavorably affect the efficiency or selectivity of a particular specimen of zeolite mineral for a particular application. Also, certain steps in the manufacture of the zeolite, such as filtration, or in its subsequent compositing with binders or with a matrix, are likely to be affected by the size, the shape, and the surface smoothness of the crystals. Thus, what is herein designated the "microscopic texture" of a particular specimen of synthetic zeolite mineral is an important characteristic of the specimen. By way of illustration, U.S. Pat. No. 4,025,571 to Lago describes a process for converting monohydric alcohols having up to four carbon atoms or their ethers to a mixture of $C_2$–$C_3$ olefins and monocyclic aromatic hydrocarbons with a catalyst, e.g. ZSM-5, having a crystal size of at least 1 micron. U.S. Pat. No. 4,025,572, also to Lago, describes a process for converting lower alcohols, especially methanol, to a mixture rich in $C_2$–$C_3$ olefins and mononuclear aromatics, and Table III therein shows the effect of crystal size on selectivity for ethylene.

The term "microscopic texture" as used herein refers to the character of the individual crystals of zeolite or aggregates thereof as observed with the electron microscope. A synthetic zeolite crystallizes as a fine powder which exhibits an x-ray diffraction pattern characteristic of that particular type of zeolite. Microscopic examination of two different preparations of the same mineral may show, however, that the individual particles of the two powders are very different, the substantial identity of the x-ray diffraction patterns notwithstanding. For example, the two preparations may differ in crystal shape, or in having predominantly large or predominantly small crystals; and while in one preparation the crystals may be largely discrete, or singly twinned; the other may exhibit multiply twinned crystals even to the extent of forming a honeycomb-like or reticulated structure consisting of many small multiply twinned crystals; and, the crystals of the two preparations may vary in smoothness. Different preparations of mordenite, as noted on page 262 of the hereinabove cited reference on "Zeolite Molecular Sieves" by D. W. Breck, demonstrate such dissimilar microscopic appearances. There is no particular consistency among different authors in the use of terms to describe the microscopic texture of a zeolite specimen. The terms and measures used, however, do relate to one or more observable features including the shape, the size, the degree of smoothness, and the degree of discreteness of the ultimate crystals, and it is in this sense that the term "microscopic texture" is used herein. Further, a reference herein to an alteration in microscopic texture, or to a different microscopic texture, in general will refer to a microscopically observable change or difference in at least the shape of the crystals, or the size of the crystals, or the degree of discreteness of the crystals, or the smoothness of the crystals, and to microscopically observable changes or differences in two or more of these features.

The preparation of mordenite from aqueous inorganic compositions is well known. In one such composition wherein the alkali metal is sodium, a source of alumina such as sodium aluminate, a source of silica such as sodium silicate, and a source of soda which may be the sodium silicate alone, are brought together in defined proportions in water, and the pH is adjusted if necessary, to compose a mordenite-forming aqueous inorganic composition. This forming mixture is hydrothermally treated (i.e. heated with or without pressure at a temperature and for a time to induce crystallization) to form mordenite mineral. There are several recipes in the literature for making mordenite, including those using pumice and clay in the aqueous inorganic composition, and those shown on pages 261–265 of the above cited reference to Breck. U.S. Pat. No. 3,436,174 to L. B. Sand, incorporated herein by reference, describes a process for making mordenite.

U.S. Pat. No. 4,018,870 to Whittam describes suppression of the formation of unwanted zeolite contaminants during crystallization by adding to the zeolite forming mixture a basic dye, the mol ratio of dye to $Al_2O_3$ in the aqueous mixture being less than 0.1 to 1. In some recipes the dye causes a new zeolite to form.

It is an object of this invention to provide a process for manufacturing synthetic mordenite wherein large, easily filtered crystals are formed. It is a further object of this invention to provide a process for manufacturing synthetic mordenite particularly useful as catalyst. It is a further object of this invention to control the microscopic texture of a synthetic mordenite. These and other objects will be apparent to one skilled in the art on reading this entire specification including the claims thereof.

DESCRIPTION OF THE INVENTION

Figure 1:
FIG. 1 Scanning electron Micrograph of mordenite produced without additive (Example 1).
Figure 2:
FIG. 2 Scanning Electron Micrograph of mordenite produced with ethyl pyridinium bromide additive (Example 2).

It has now been found that the microscopic texture of the mordenite mineral crystallized from a mordenite-forming aqueous inorganic composition is altered in a desired way by the addition of a suitable substantially colorless organic basic nitrogen compound to the forming composition. This effect may be achieved without altering the proportions of inorganic constituents, including water, in the aqueous inorganic forming solution, and without altering the hydrothermal treatment conditions. Thus, the process of this invention provides a facile means for producing mordenite mineral of a microscopic texture desirable for further processing or for a particular use.

In the practice of this invention, a forming composition for mordenite is prepared from inorganic constituents in the usual way. The forming composition selected preferably is one which, when treated at a given temperature and pressure, produces substantially pure mordenite mineral, i.e. a product which has the x-ray diffraction pattern characteristic for mordenite with no significant contamination by other zeolites. To the forming composition is added a substantially colorless organic basic nitrogen compound more fully described hereinbelow in an amount effective to alter the microscopic texture of the crystals, i.e. produce crystals having a microscopic texture different from that produced without additive. Most preferably the addition is made prior to any hydrothermal treatment. The hydrothermal treatment of the forming solution containing the organic basic nitrogen compound is then conducted to form the mordenite mineral having the desired microscopic texture.

The substantially colorless organic basic nitrogen compounds useful for the purposes of this invention include those compounds which contain at least one nitrogen atom directly attached to a carbon atom, and which are soluble or dispersible in the aqueous forming solution. Contemplated as within the scope of this invention are the primary amines, secondary amines, tertiary amines, quaternary ammonium compounds, and heterocyclic nitrogen compounds. These compounds may be aliphatic or aromatic, but in all cases are characterized by a chemical structure free of strong chromophoric groups which, with the compound in the free base or salt form, would result in markedly reduced transmittance of visible light in the wavelength range of 4000 Angstroms to 7000 Angstroms. More specifically, any amine is regarded as substantially colorless for the purpose of this invention if a 5% solution of the pure amine in water or colorless organic solvent appears colorless or almost so when contained in an optical cell not more than 1 centimeter thick when observed by transmitted daylight.

The amount of basic nitrogen compound used in the present invention is from about 0.01 mol to about 0.50 mol per mol of $SiO_2$ in the mordenite forming solution, said amount being effective to produce the desired microscopic texture. In computing the $SiO_2$ content of the forming solution for the purpose of this invention, all reactive or potentially reactive silica contained therein, regardless whether present in the form of dissolved silicate, gelled silcate, silica gel, clay, etc., is assumed present as $SiO_2$. In some instances in the practice of this invention it is observed that use of excess amine severely retards crystallization of the mordenite, and use of such excess is to be avoided. Also to be avoided is the use of those amines which, with a particular mordenite forming solution, tend to produce zeolite contaminants which are clearly not of the mordenite type.

Amines useful in the present invention include tributylamine, diisobutylamine, cyclohexylamine, isobutylamine, diisopropylamine, cycloheptylamine, triethylamine, and tert-octylamine. Tetraethylammonium bromide and ethyl pyridinium are illustrative of useful quaternary ammonium compounds. In general, it is preferred that the organic basic nitrogen compound used is one which has a base dissociation constant $pK_a$ from about 7 to about 12.

It is not understood why the microscopic texture or morphology is modified by the method of this invention. However, without wishing to be bound by theory, it may be speculated that absorption of the organic compound selectively on one of the growing crystal faces modifies the growth pattern. All of the recited amines or quaternary ammonium compounds may not be equally effective in the process of this invention, and the nature of the modification may be different with different organic compounds, as will be further illustrated hereinbelow. In any case, it is a simple matter to test an organic compound on a laboratory scale at several concentrations to determine the nature of the modification and to estimate an effective amount to use.

Whereas this invention has been described with particular reference to mordenite which is an aluminosilicate, it is to be understood that contemplated as within the scope of this invention are mordenites formed with gallium or germanium substituting for the aluminum and silicon, respectively. Also contemplated as within the scope of this invention is to utilize an organic basic phosphorous compound or arsenic compound having a $pK_a$ within the range of about 7 to about 12 instead of the organic basic nitrogen compound.

The examples which follow are for the purpose of illustrating the invention described above and are not to be construed as limiting said invention. In the examples all parts are by weight unless specified otherwise.

EXAMPLE 1

A mordenite forming solution was prepared to have the following mol ratios of reaction mixture components:

A mordenite forming solution was prepared to have the following mol ratios of reaction mixture components:

$SiO_2/Al_2O_3 = 30$ $H_2O/SiO_2 = 40$
$Na/SiO_2 = 0.6$
$OH/SiO_2 = 0.3-0.4$ with sulfuric acid added as necessary to bring the $OH^-/SiO_2$ ratio within the range shown. The sole source of silica was Q-brand sodium silicate, manufactured by Philadelphia Quartz, and the alumina source was $Al_2(SO_4)_3 \cdot 16H_2O$.

The forming solution was crystallized by maintaining it at 140°–160° C. with agitation for about 5 days. Examination of the crystals by scanning electron micrograph (SEM) showed these to be ill-defined aggregates 10 to 50 microns in size. FIG. 1 of the drawing shows a photograph of these crystals which were made in the conventional manner, i.e. with no basic nitrogen compound in the forming mixture.

EXAMPLE 2

To the forming solution made as described in Example 1 and having the same composition was added sufficient ethyl pyridinium bromide (EtPyBr) to provide a mol ratio of basic nitrogen compound to $SiO_2$ of 0.3. The forming solution was then crystallized under the same conditions as described in Example 1.

SEM examination showed the crystals to be predominantly honeycombs of about 5 microns in size formed of about 0.1 micron platelets.

EXAMPLE 3

Example 2 was repeated with tri-n-butylamine used instead of EtPyBr as the basic nitrogen compound.

Figure 3:
FIG. 3 Scanning Electron Micrograph of mordenite produced with tributylamine additive (Example 3).

FIG. 3 of the drawing shows that the crystals formed in this instance were predominantly well-shaped blocks 2 to about 10 microns in size.

EXAMPLE 4

Example 2 was repeated with diisobutylamine used instead of EtPyBr as the basic nitrogen compound.

SEM examination showed the crystals to be predominantly 0.5 to 5 micron chunks.

EXAMPLE 5

Example 2 was repeated with cyclohexylamine used instead of EtPyBr as the basic nitrogen compound.

SEM examination showed the crystals to be predominantly 100 micron multi-faceted aggregates.

EXAMPLE 6

Example 2 was repeated with isobutylamine used instead of EtPyBr as the basic nitrogen compound.

SEM examination showed the crystals to be predominantly 1 by 3 micron oval cylinders.

EXAMPLE 7

Example 2 was repeated with diisopropylamine used instead of EtPyBr as the basic nitrogen compound.

SEM examination showed the crystals to be predominantly 2 to 5 micron well-shaped blocks.

EXAMPLE 8

Example 2 was repeated with cycloheptylamine used instead of EtPyBr as the basic nitrogen compound.

SEM examination showed the crystals to be predominantly 10 to 20 micron multi-faceted aggregates.

EXAMPLE 9

Example 2 was repeated with triethylamine used instead of EtPyBr as the basic nitrogen compound.

SEM examination showed the crystals to be predominantly 1 to 3 micron oblongs with some aggregation.

EXAMPLE 10

Example 2 was repeated with trioctylamine used instead of EtPyBr as the basic nitrogen compound.

SEM examination showed the crystals to be predominantly 5 micron multi-faceted aggregates.

EXAMPLE 11

A forming solution was made as in Example 1 but with the following composition expressed as mol ratios:
$SiO_2/Al_2O_3 = 30$
$H_2O/SiO_2 = 15$
$Na/SiO_2 = 0.8$
$OH/SiO_2 = 0.5$ Sufficient tetraethylammonium bromide was added to provide a mol ratio of basic nitrogen compound to $SiO_2$ of 0.4 and the forming solution was crystallized under the same conditions as in Example 1. The crystals obtained were predominantly in the form of chunks of 0.5 to 2 micron particle size.

What is claimed is:

1. In a process for manufacturing synthetic mordenite, which process comprises hydrothermally treating an aqueous, inorganic mordenite forming solution that contains a source of $SiO_2$ whereby forming substantially pure synthetic mordenite having a characteristic microscopic texture, the improvement which comprises adding to said forming solution an amount of substantially colorless organic basic nitrogen compound, said amount being effective to alter said microscopic texture of said substantially pure mordenite.

2. The process claimed in claim 1 wherein said organic basic nitrogen compound has a $pK_a$ from about 7 to about 12, and said effective amount is from about 0.01 mol to about 0.50 mol per mol of said $SiO_2$ in the mordenite forming solution.

3. The process claimed in claim 1 wherein said organic basic nitrogen compound is a quaternary ammonium compound and said effective amount is from about 0.01 mol to about 0.50 mol per mol of said $SiO_2$ in the mordenite forming solution.

4. The process described in claim 2 wherein said organic basic nitrogen compound is tributylamine.

5. The process described in claim 2 wherein sad organic basic nitrogen compound is cyclohexylamine.

6. The process described in claim 3 wherein said organic basic nitrogen compound is ethylpyridinium bromide.

* * * * *